(12) United States Patent
Kazymyrenko et al.

(10) Patent No.: US 11,441,984 B2
(45) Date of Patent: Sep. 13, 2022

(54) SYSTEM AND METHOD FOR DETERMINING CHARACTERISTICS OF A CRACK

(71) Applicant: ELECTRICITE DE FRANCE, Paris (FR)

(72) Inventors: Kyrylo Kazymyrenko, Palaiseau (FR); David Haboussa, Massy (FR)

(73) Assignee: ELECTRICITE DE FRANCE, Paris (FR)

( * ) Notice: Subject to any disclaimer, the term of this patent is extended or adjusted under 35 U.S.C. 154(b) by 378 days.

(21) Appl. No.: 16/700,184

(22) Filed: Dec. 2, 2019

(65) Prior Publication Data
US 2020/0173896 A1 Jun. 4, 2020

(30) Foreign Application Priority Data
Nov. 30, 2018 (FR) ...................................... 18 72185

(51) Int. Cl.
*G01N 3/32* (2006.01)
*G01M 5/00* (2006.01)
(Continued)

(52) U.S. Cl.
CPC ................. *G01N 3/34* (2013.01); *G01B 5/30* (2013.01); *G01N 3/06* (2013.01); *G01N 27/90* (2013.01);
(Continued)

(58) Field of Classification Search
CPC ... G01N 2203/0017; G01N 2203/0019; G01N 2203/0062; G01N 2291/0289;
(Continued)

(56) References Cited

U.S. PATENT DOCUMENTS

| 4,823,609 A * | 4/1989 | Yost | G01N 29/11 73/799 |
| 5,534,289 A * | 7/1996 | Bilder | G01N 21/91 73/104 |
| 2016/0370269 A1* | 12/2016 | Hsueh | G01N 3/08 |

FOREIGN PATENT DOCUMENTS

| JP | S63-229339 A | 9/1988 |
| JP | 2002-349178 A | 12/2002 |
| JP | 2005-338056 A | 12/2005 |

OTHER PUBLICATIONS

Search Report issued in related application FR 18 72185, dated Oct. 9, 2019, 12 pages.

* cited by examiner

*Primary Examiner* — Brandi N Hopkins
(74) *Attorney, Agent, or Firm* — Faegre Drinker Biddle & Reath LLP

(57) ABSTRACT

A method for determining characteristics of a crack detected in a material, comprising: determining initial mechanical loads applied to the material, applying a plurality of crack-opening mechanical loads to the material, each opening mechanical load being a linear combination of the initial mechanical loads, and measuring the relative displacement of the first point with respect to the second point induced by each opening mechanical load, applying a plurality of crack-closing mechanical loads to the material, each closing mechanical load being a linear combination of the initial mechanical loads, and measuring the relative displacement of the first point with respect to the second point induced by each closing mechanical load, and estimating the direction of the crack as a function of the amplitude of each opening and closing mechanical load applied to the material and of the measured relative displacements.

19 Claims, 7 Drawing Sheets

(51) Int. Cl.
    *G01N 3/34*         (2006.01)
    *G01B 5/30*         (2006.01)
    *G01N 3/06*         (2006.01)
    *G01N 27/90*       (2021.01)
    *G01N 29/04*       (2006.01)

(52) U.S. Cl.
    CPC ... *G01N 29/043* (2013.01); *G01N 2203/0017* (2013.01); *G01N 2203/0019* (2013.01); *G01N 2203/0062* (2013.01); *G01N 2291/0289* (2013.01); *G01N 2291/044* (2013.01); *G01N 2291/048* (2013.01)

(58) Field of Classification Search
    CPC ....... G01N 2291/044; G01N 2291/048; G01N 3/08; G01N 3/32; G01N 3/10; G01N 27/02; G01M 5/00; E21B 47/00; G01V 3/20
    See application file for complete search history.

SYSTEM AND METHOD FOR DETERMINING CHARACTERISTICS OF A CRACK

CROSS-REFERENCE TO RELATED APPLICATION

This application claims priority benefit under 35 U.S.C. § 119(d) from French Patent Application No. 18 72185, filed Nov. 30, 2018, the disclosure of which is incorporated by reference herein in its entirety

FIELD

The field of the invention relates to the cracking of materials and more specifically to systems and methods for determining the characteristics of a crack detected in a material, in particular the direction as well as the position of the crack tip or tips.

BACKGROUND

Identification of a crack in a material is a major issue in industry today. Indeed, the propagation of a crack in an industrial structure can result in a malfunction. For example, the propagation of cracks in piping can result in undesirable leaks presenting a potential hazard.

When the characteristics of the crack are available, in particular the direction as well as the position of the tip or tips of the crack, the known formalism of linear elastic fracture mechanics (known by the acronym LEFM) is generally used to predict the propagation of the crack and the probability of this propagation. This predictive analysis makes it possible to evaluate the harmfulness of a crack and to implement the means necessary to prevent the detected crack from propagating in the threatened material. In addition to the possibility of reducing the mechanical loads applied, it is known to apply mechanical loads to the cracked material to hinder the propagation of the crack.

The principles of linear elastic fracture mechanics are particularly suitable for fragile or somewhat fragile materials such as glass, ceramics, or plexiglass. For this type of material, it is observed that the relative displacements of one point relative to another or the opening of the crack are linearly related to the mechanical loads applied. In addition to this property of linearity, the similarity in the crack-opening profile for various types of loads are observed, which makes it possible to describe them by a reduced number of parameters. However, the same principles can also be used to make a more approximate estimate for materials whose behavior exhibits greater non-linearity when a crack is present, such as concrete, graphite, or metals at low temperature.

In order to carry out a predictive analysis of the propagation of a crack based on the formalism of linear elastic fracture mechanics, it is essential to determine in advance the direction of the crack as well as the position of its tip or tips.

Among the non-destructive methods, there is the known method for example of digital image correlation (known by the acronym DIC) using an acquisition camera and which allows, under conditions of strong lighting and no movement of the acquisition camera, achieving a measurement accuracy that is more than satisfactory. Even so, the sensitivity of the digital image correlation to the movements of the acquisition camera as well as the need to have data processing facilities close to the threatened industrial structure make this method difficult to use for a very large number of industrial structures.

It is also known to scatter neutrons or X-rays in the material in which a crack has been identified. This method is also non-destructive, but is incompatible with a large number of industrial structures and is therefore not generally recommended in industry.

The present invention improves the situation.

SUMMARY

For this purpose, a method is provided for determining characteristics of a crack in a material. The presence of the crack is detected beforehand in an area of presence of the material, using a non-destructive process. The method comprises:

determining at least two initial mechanical loads applied to the material, each mechanical load being defined by a vector field of known amplitude, applying a plurality of crack-opening mechanical loads to the material, each opening mechanical load being a linear combination of the at least two initial mechanical loads, measuring, using at least one measuring instrument, a relative displacement of a first point with respect to a second point induced by each opening mechanical load, the first and second points being located in the area of presence of the crack, each measuring instrument being associated with a pair of first and second points, applying a plurality of crack-closing mechanical loads to the material, each closing mechanical load being a linear combination of the at least two initial mechanical loads, measuring, using each measuring instrument, the relative displacement of the first point with respect to the second point induced by each closing mechanical load, and estimating the direction of the crack, by computer means, as a function of the amplitude of each opening and closing mechanical load applied to the material and of the relative displacements measured by the measuring instrument(s).

Such a method constitutes a non-destructive method for determining the characteristics of a crack, and in particular its direction, in a material. The determination, or at least the estimation, of the direction of the crack makes it possible to evaluate the harmfulness of the crack and hinder its propagation. Cracks represent a danger for an industrial structure when they affect a material of this structure.

According to one aspect of the invention, at least one measuring instrument is an extensometer.

According to another aspect of the invention, the opening and closing mechanical loads applied to the material are of small amplitude, thus mechanical loads ensuring the material to keep an elastic and linear mechanism behavior.

It is known to those skilled in the art that a mechanical load that a mechanical load is of small amplitude when its application does not alter the material and that the latter maintains an elastic behavior, even under the constraint of this mechanical load.

By applying small-amplitude mechanical loads to the material, the material will adopt an elastic and linear behavior. A material to which the formalism and principles of linear elastic fracture mechanics apply has certain properties useful for determining the direction of the crack. One will in fact observe that the relative displacements of one point of the material relative to another point of the material, or the opening of the crack, are linearly related to the mechanical loads applied. In addition, similarity in the crack opening profile is observed for various types of load, which makes it possible to describe them by a small number of parameters.

According to another aspect of the invention, weighting coefficients for the linear combination of the initial mechanical loads are real numbers between −1 and 1.

According to another aspect of the invention, the measurement of the relative displacement of a first point with respect to a second point comprises measuring the relative displacement of the first point with respect to the second point in a first direction and measuring the relative displacement of the first point with respect to the second point in a second direction orthogonal to the first direction.

It is advantageous to determine the direction of the crack in a plane. We therefore consider a projection of the material in a plane rather than considering the material in three dimensions. The characteristics of the projection of the crack in the chosen plane are then considered, and the first and second directions considered are directions according to orthogonal vectors defining the plane. This plane is advantageously a previously selected plane of interest. In other words, determining the direction of the crack corresponds in fact to determining the direction of the projection of the crack in the plane. Similarly, as detailed hereinafter, determining the position of the tip or tips of the crack corresponds in fact to determining the position of the projection of the tip or tips of the crack in the plane.

According to another aspect of the invention, the method further comprises the determination, for each pair of first and second points, of an opening surface representing the amplitude of the opening mechanical load applied to the material as a function of the relative displacement of the first point with respect to the second point in the first direction and of the relative displacement of the first point with respect to the second point in the second direction in a coordinate system (O, x, y, z), where x is the displacement in the first direction, y is the displacement in the second direction, and z is the amplitude of the load applied to the material.

According to another aspect of the invention, the opening surface is similar to a cone of revolution truncated along a plane orthogonal to the base of the cone and comprising the vertex of the cone.

Indeed, for a material that fully satisfies the hypotheses from applying the formalism and principles of linear elastic fracture mechanics, the opening surface obtained, for pairs of measurement points located one on each side of the crack in close proximity to one another, will be a truncated cone. However, in practice, these theoretical hypotheses in which the material adopts elastic and linear behavior so that the opening surface approaches or is similar to a truncated cone are not fully satisfied. In addition, with only the area of presence of the crack being known, the pairs of measurement points will not necessarily all be located one on each side of the crack.

According to another aspect of the invention, the method further comprises the determination, for each pair of first and second points, of a closing surface representing the amplitude of the closing mechanical load applied to the material as a function of the relative displacement of the first point with respect to the second point in the first direction and of the relative displacement of the first point with respect to the second point in the second direction in a coordinate system (O, x, y, z), where x is the displacement in the first direction, y is the displacement in the second direction, and z is the amplitude of the load applied to the material.

According to another aspect of the invention, the closing surface is similar to a plane.

Indeed, for a material that perfectly satisfies the hypotheses from applying the formalism and principles of linear elastic fracture mechanics, the closing surface obtained, for pairs of measurement points located one on each side of the crack in close proximity to one another, will be a plane. However, in practice, for the same reasons as those mentioned above for the opening surface, these theoretical hypotheses in which the closing surface approaches or is similar to a plane are not fully satisfied.

According to another aspect of the invention, the determination of the direction of the crack comprises:
  determining the line of intersection of the truncation plane of the cone of revolution corresponding to the opening surface and of the plane corresponding to the closing surface,
  determining the orthogonal projection of the line of intersection on plane (Oxy) and an angle characterizing the direction of the projected line obtained.

The angle in question corresponds to the angle formed by the projected line obtained, thus the orthogonal projection of the line of intersection of the truncation plane of the cone of revolution and the plane corresponding to the closing surface, and by the axis corresponding to the relative displacement along the axis x or the axis corresponding to the relative displacement along axis y.

In a first case, the crack is a surface crack. The crack thus has an opening at the boundary between the interior and the exterior of the material. In this situation, a single measuring instrument is installed to measure the relative displacement of a first point with respect to a second point, the first and second points being located one on each side of the crack at the level of the opening at the boundary between the interior and the exterior of the material. The angle characterizing the direction of the projected line then corresponds to the direction of the crack.

Still in this first case, the length of the crack corresponding to the distance between the opening and the tip of the crack is determined using a non-destructive process. According to another aspect of the invention, the method further comprises the determination of the tip of the crack as a function of the direction and length of the crack.

Indeed, when the crack is a surface crack, it has an opening at the boundary between the interior and the exterior of the material so that the exact position of at least a portion of the crack is known, namely the points located at the opening. This information makes it possible to directly select at least one pair of first and second relevant points, meaning points located at the opening, one on each side of the crack. The surface character of the crack also makes it possible to implement a non-destructive process for deriving its length. The combination of information about the direction and length of the crack then makes it possible to determine, or at least estimate, the position of the tip of the crack.

Alternatively, in a second case, the crack is an embedded crack and a plurality of measuring instruments is installed. According to one aspect of the invention, the method further comprises the generation of a histogram of angle values obtained for each pair of first and second points, the direction of the crack being determined on the basis of the histogram.

Still in this second case, according to another aspect of the invention, the direction of the crack corresponds to the angle of a local maximum of the histogram. More specifically, the local maximum for determining the direction of the crack is the local maximum furthest from 0°.

When the crack is embedded, less information is available than when the crack is open to the surface. In particular, only one area of presence of the crack is known and it is not possible to guarantee that the pairs of measurement points will be selected so that, for each of these pairs, the first point and second point will be located one on each side of the crack. It is therefore necessary to cover the area of presence of the crack as much as possible and to make relative displacement measurements for each pair of points in the plurality of pairs of measurement points. A histogram then makes it possible to transform a two-dimensional problem, where the points are in a plane, to a one-dimensional problem where the points are then in a line corresponding to the direction of the crack. Indeed, the angle obtained for the pairs of measurement points located one on each side of the crack is significantly close to the angle value characterizing the direction of the crack, so a histogram providing a statistical assessment of the obtained angle values makes it possible to determine the direction of the crack.

According to another aspect of the invention, the method further comprises the determination of the respective positions of the tips of the crack, the determination comprising:
- plotting a curve representing, along the direction of the crack, the angle obtained for each pair of first and second points located in the direction of the crack,
- determining, based on the angle corresponding to the direction of the crack, a plateau in the plotted curve, such that the two pairs of first and second points marking the two ends of the plateau respectively correspond to the tips of the crack.

The pairs of points located in the direction of the crack typically correspond to the pairs of measurement points for which the angle $\alpha_i$ obtained is in a neighborhood of the angle $\alpha$. For example, the range of angle values $\alpha_i$ for which the pairs of measurement points are considered relevant, i.e. in the direction of the crack, corresponds to the range of values from the largest local minimum less than $\alpha$ to the smallest local minimum greater than $\alpha$.

As previously explained, the histogram makes it possible to determine the direction of the crack as well as the pairs of relevant measurement points. We then know that the tips of the crack are located on a straight line. By identifying a plateau in the curve representing the angle obtained for each pair of measurement points located one on each side of the crack, it is then possible to deduce the position of the tips of the crack.

According to another aspect of the invention, the method further comprises the prediction of the propagation of the crack, using the direction, the position of the tip or tips of the crack, and the model of linear elastic fracture mechanics, in order to evaluate its harmfulness.

The invention also relates to a computer program comprising instructions for implementing the method described above, when the instructions are executed by at least one processor.

Finally, the invention also provides a system for determining characteristics of a crack in a material. The presence of the crack is detected beforehand in an area of presence of the material by means of a non-destructive process. The system comprises:
- a diagnostic module for the material, arranged to determine at least two initial mechanical loads applied to the material, each mechanical load being defined by a vector field of known amplitude,
- a device for applying mechanical loads, arranged for:
  - applying a plurality of crack-opening mechanical loads to the material, each opening mechanical load being a linear combination of the at least two initial mechanical loads,
  - applying a plurality of crack-closing mechanical loads to the material, each closing mechanical load being a linear combination of the at least two initial mechanical loads,
- at least one measuring instrument arranged to measure a relative displacement of a first point with respect to a second point induced by each opening load and by each closing load, the first and second points being located in the area of presence of the crack, each measuring instrument being associated with a pair of first and second points, and
- a processing unit arranged to estimate the direction of the crack as a function of the amplitude of each opening and closing mechanical load applied to the material and of the relative displacements measured by the measuring instrument(s).

BRIEF DESCRIPTION OF THE DRAWINGS

Other features, details, and advantages of the invention will be apparent from reading the following detailed description and from an analysis of the appended drawings, in which:

FIG. 1 illustrates a system 1 for determining characteristics of a crack 3 in a material 5. The material 5 having the crack 3 is also illustrated in FIG. 1.

In the context of the invention, the crack 3 has been previously detected in the material 5 using a non-destructive process. More generally, the term non-destructive testing is used (known by the acronym NDT), meaning the set of methods for evaluating the integrity of a material and detecting the presence of a crack without damaging the material. For example, the crack 3 was detected in the material 5 by means of an eddy-current testing technique based on the flow of currents induced in a material capable of conducting electricity. Among these non-destructive processes, it is also possible to use ultrasonic testing based on the transmission and reflection of ultrasonic waves within the material.

Typically, the material 5 is a fragile or somewhat fragile material such as glass, ceramic, or plexiglass. For this type of material, it is observed that the relative displacements of one point with respect to another or the opening of the crack are linearly related to the mechanical loads applied. These characteristics of the material 5 are particularly advantageous because, as explained in the rest of the description, they allow using the formalism and principles of linear elastic fracture mechanics (known by the acronym LEFM) to perform a predictive analysis. However, the same principles can also be used to make a rough estimate for materials whose behavior has greater non-linearity in the presence of a crack. Thus, the material 5 may also be a material having greater non-linearity, such as concrete, graphite, or metal at low temperature.

Figure 2A:
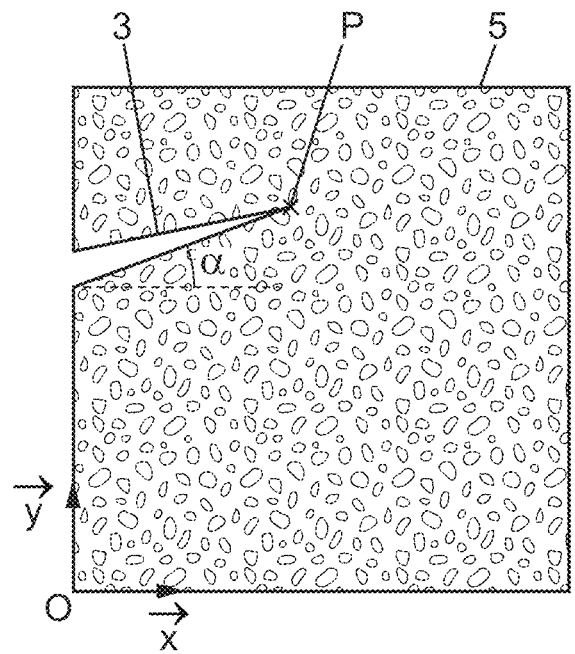
FIG. 2A illustrates a material having a surface crack.
Figure 2B:
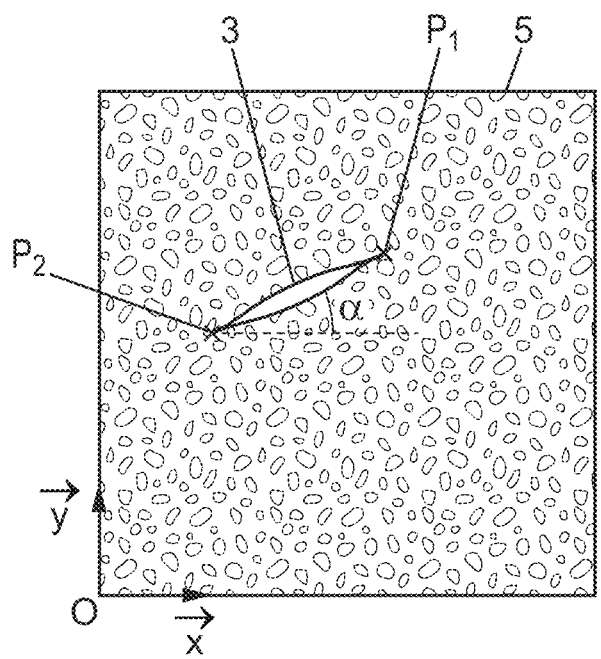
FIG. 2B illustrates a material having an embedded crack.

The system 1 is arranged to determine characteristics of the crack 3 identified in the material 5. More specifically, the system 1 is arranged to estimate the direction of the crack 3. Advantageously, the system 1 is further arranged to determine the position of the tip or tips of the crack 3. In fact, in the case of a surface crack 3, it has a single tip, also called the leading edge of the crack, while in the case of an embedded crack 3, it then has two tips. These two cases are illustrated in particular in FIG. 2A and FIG. 2B. FIG. 2A illustrates a surface crack 3 while FIG. 2B illustrates an embedded crack 3.

Determining the characteristics of the crack 3 of the material 5, and in particular determining the direction and position of the tip or tips of the crack 3, makes it possible to subsequently use the formalism and principles of linear elastic fracture mechanics to perform a predictive analysis of the propagation of the crack 3 in the material 5. The prediction of the propagation of the crack 3 allows evaluating its harmfulness, especially when the material 5 is an element of an industrial structure at risk. Such predictive analysis then makes it possible to implement means to hinder propagation of the crack.

Figure 1:
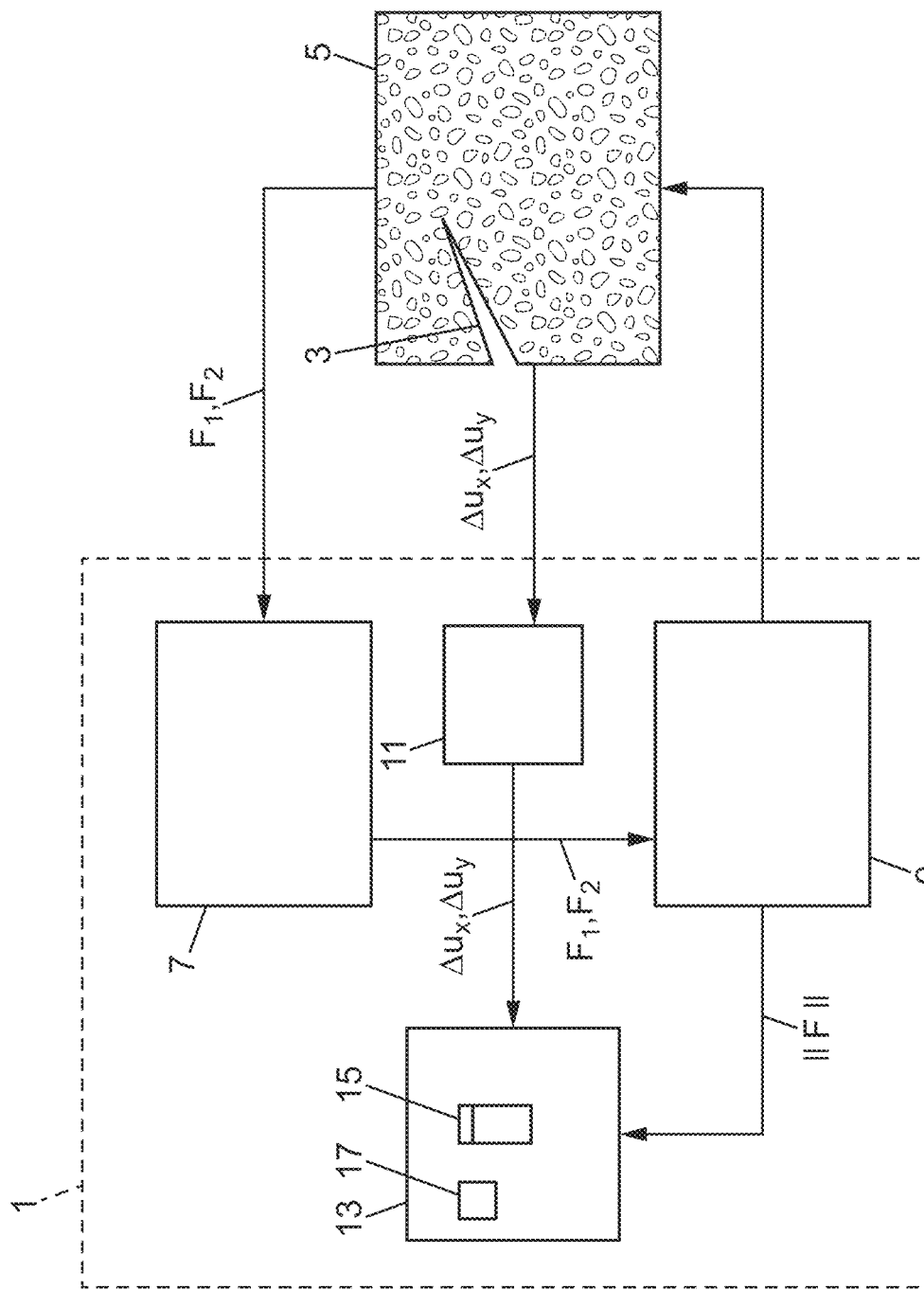
FIG. 1 illustrates a system for determining characteristics of a crack in a material according to the invention.

As shown in FIG. 1, the system 1 comprises a diagnostic module 7, a device 9 for applying mechanical loads, at least one measuring instrument 11, and a processing unit 13.

The diagnostic module 7 is arranged to determine at least two initial mechanical loads applied to the material 5. A mechanical load is defined by a vector field. Each mechanical load can be modified by modifying its amplitude where the corresponding vector field is multiplied by a scalar number; it is then called a change in the load amplitude. An initial mechanical load is a mechanical load of known amplitude. A mechanical load can designate an external pressure applied to the material 5, the weight of the material 5, mechanical bending, tensile stress, or any other mechanical stress undergone by the material 5. These initial mechanical loads may be the cause of the formation of the crack 3 or may facilitate its progression. These initial mechanical loads may also have had no effect on the formation of the crack 3.

In any case, the initial mechanical loads may be any mechanical loads applied to the material 5. Advantageously, as explained above, the initial mechanical loads are mechanical loads likely to solicit the crack, thus to encourage its opening or closing. In this respect, the prior detection of the presence of the crack in the material 5 by means of a non-destructive process may also make it possible to determine initial mechanical loads responsible for the presence of the crack or having an impact on it. The two initial mechanical loads can then be two mechanical loads among the mechanical loads thus detected.

In the example illustrated in FIG. 1, the diagnostic module 7 has detected two initial mechanical loads $F_1$ and $F_2$. Of course, it is understood that the diagnostic module 7 can determine more than two initial mechanical loads.

The diagnostic module 7 is further arranged to transmit information concerning the determined initial mechanical loads to the device 9 for applying mechanical loads.

The device 9 for applying mechanical loads is arranged to apply one or more crack 3 opening mechanical loads to the material 5. Each opening mechanical load applied to the material 5 is a linear combination of the initial mechanical loads identified by the diagnostic module 7. An opening mechanical load, when applied to the material 5, allows opening the crack 3, meaning separating the lips of the crack 3.

The device 9 is further arranged to apply one or more crack-closing mechanical loads to the material. Similarly to the opening mechanical loads, each closing mechanical load is a linear combination of the initial mechanical loads. In contrast to an opening mechanical load, a closing mechanical load, when applied to the material 5, brings the lips of the crack closer together or at least does not move them further apart from one another.

For example, a closing mechanical load can be obtained from an opening mechanical load by multiplying the associated vector field by the scalar number −1, which results in a change in direction of the mechanical load. Conversely, it is also understood that it is possible to generate an opening mechanical load from a closing mechanical load by multiplying the vector field associated with the closing mechanical load by the scalar number −1. From two initial mechanical loads, it is therefore always possible to produce two opening mechanical loads and two closing mechanical loads.

To determine whether a mechanical load applied by the device 9 is an opening mechanical load or a closing mechanical load, the skilled person has several known methods.

For example, the classification of a mechanical load (opening or closing) can be obtained by determining the stress intensity factors (SIFs). When a mechanical load is applied to the material 5, the measurement of the stress intensity factors makes it possible to determine whether the crack responds to an opening-type or closure-type mechanical load.

It is also possible to use the measuring instrument(s) 11 of the system 1. Indeed, as detailed in the following description, the measuring instrument 11 is associated with a pair of points, thus comprising a first point and a second point, and is arranged to measure a relative displacement of the first point with respect to the second point. The first and second points are located in an area of presence of the crack 3. Thus, when a mechanical load is applied by the device 9 to the material, each measuring instrument 11 measures the relative displacement of the first point with respect to the second. Thus, for a given mechanical load, if the distance between the first point and the second point increases, the mechanical load will be classified as an opening mechanical load. Conversely, if the distance between the first point and the second point decreases, the mechanical load will be classified as a closing mechanical load.

In the example illustrated in FIG. 1, the diagnostic module 7 has identified two initial mechanical loads $F_1$ and $F_2$. The opening and closing mechanical loads applied by the device 9 to the material 5 are then of the following form:

$$F = \beta \cdot F_1 + \gamma \cdot F_2$$

where:
F is an opening or closing mechanical load applied to the material 5 by the device 9; and
β and γ are real numbers such that at least one of them is non-zero.

The preceding formula is interpreted as the simultaneous application of two mechanical loads $F_1$ and $F_2$ whose amplitudes have been modified by the respective multiplicative factors, also called scalar numbers, β and γ.

Advantageously, the opening and closing mechanical loads applied to the material 5 by the device 9 are of small amplitude so that the material adopts an elastic and linear mechanical behavior. Here, the invention in the logic of non-destructive testing, i.e. that the measurements made and the application of the opening and closing mechanical loads must not alter the the material 5. The concept of mechanical load of "small amplitude" is known to the skilled person and refers to a mechanical load that ensures that the state of stress remains in the field of elasticity of the tested material, here the material 5. This ensures that the formalism and principles of linear elastic fracture mechanics do indeed apply to the material 5 subjected to the opening and closing mechanical loads applied by the device 9. For example, weighting coefficients for the linear combination of the initial mechanical loads are real numbers between 0 and 1. Returning to the example described above, we then advantageously have:

$$|\beta| \ll 1$$

$$|\gamma| \ll 1$$

The device 9 for applying mechanical loads is further arranged to transmit the amplitude, also referred to as the intensity, of each opening and closing mechanical load applied to the material 5, to the processing unit 13. The amplitude of a mechanical load is for example calculated by applying a norm to the mechanical load concerned. In the example illustrated in FIG. 1, the amplitude of a mechanical load F is denoted $\|F\|$.

The norm used to calculate the amplitude of a mechanical load applied to the material 5 is, for example, a mathematical norm defined in a vector space of dimension equal to the dimension of the base composed of the set of initial mechanical loads detected by the diagnostic module 7 and used to apply opening and closing mechanical loads to the material 5. This dimension is therefore greater than or equal to 2. Since the same initial mechanical loads are used to generate the set of opening and closing mechanical loads, the norm is for example a function of the weighting coefficients. Using the example described above and illustrated in FIG. 1, the amplitude of a mechanical load F is for example defined using the following norm:

$$\|F\| = \sqrt{\beta^2 + \gamma^2}$$

More generally, when the diagnostic module 7 has detected a number n of initial mechanical loads, where n is a natural integer greater than or equal to 2, the amplitude of a mechanical load F is for example defined as follows:

$$\|F\| = \sqrt[n]{\sum_{k=1}^{n} |\delta_k|^n}$$

where: $\delta_k$ is the $k^{th}$ weighting coefficient of the linear combination of the n initial mechanical loads.

Moreover, the norm used to calculate the amplitude of a mechanical load F applied to the material 5 can also be a function of the amplitude of the initial mechanical loads.

The measuring instrument 11 is arranged to measure a relative displacement of a first point with respect to a second point, the first and second points being located in an area of presence of the crack 3. In other words, each measuring instrument 11 is configured to be associated with a pair of points of the material 5, preferably near the crack 3, and to measure the relative displacement of one point in the associated pair of points with respect to the other point in the pair of points.

More specifically, in the context of the present invention, each measuring instrument 11 is arranged to measure the relative displacement of a first point with respect to a second point induced by each opening load and by each closing load. Indeed, each opening load applied to the material 5 is capable of inducing the relative displacement of a first point with respect to the second point associated with this first point. In the context of the invention, it is thus understood that, in response to the application of an opening mechanical load to the material 5, each measuring instrument 11 measures the relative displacement of the first point with respect to the second point, the pair formed by the first and second points in question being the pair of points associated with the measuring instrument 11 considered. Similarly, in response to the application of a closing mechanical load to the material 5, each measuring instrument 11 measures the relative displacement of the first point with respect to the second point, the pair formed by the first and second points in question being the pair of points associated with the measuring instrument 11 considered.

Advantageously, the measurement of the relative displacement of a first point with respect to a second point comprises measuring the relative displacement of the first point with respect to the second point in a first direction and measuring the relative displacement of the first point with respect to the second point in a second direction orthogonal to the first direction. We thus end up with measurements in two dimensions instead of three dimensions. It is clear that, in the rest of the description, it is not the crack 3 that is considered but, more precisely, the projection of the crack 3 in the chosen plane of interest.

The determination of the characteristics of the crack 3 must therefore be understood, in the remainder of the description, as the determination of the characteristics of the projection of the crack 3 in the plane of interest. For example, again with reference to FIG. 2A and FIG. 2B, we consider the projection of the material 5 in a plane (Oxy) rather than considering the material in three dimensions.

In other words, measuring the relative displacement of a first point with respect to a second point comprises measuring the relative displacement of the first point with respect to the second point in a first direction and measuring the relative displacement of the first point with respect to the second point in a second direction orthogonal to the first direction, the first and second directions defining, with a point O, a plane of interest such that the projection of the crack 3 in the plane of interest is being considered and such that the characteristics of the crack 3 are, in fact, the characteristics of the projection of the crack 3 in the plane of interest.

In the context of the invention, we are therefore considering the projection of the crack 3 in a plane of interest, here plane (Oxy), in order to change from a problem in three dimensions to a problem in two dimensions. Determining the direction of the crack 3 therefore corresponds more precisely to determining the direction of the projection of the crack 3 in plane (Oxy). Similarly, determining the position of the tip or tips of the crack 3 is in fact determining the position of the projection of the tip or tips of the crack 3 in plane (Oxy). Plane (Oxy) is for example a previously defined plane of interest. For example, when the material 5 corresponds to a pipe of an industrial structure, a plane of interest is a longitudinal sectional plane of the pipe. The relative displacement of a first point with respect to a second point measured by the measuring instrument 11 then comprises the measurement of the relative displacement in direction x and the measurement of the relative displacement in direction y.

In the example illustrated in FIG. 1, the measuring instrument 11 measures, after the application of a mechanical load to the material 5, a displacement $\Delta u_x$ in direction x and a displacement $\Delta u_y$ in direction y.

The measuring instrument 11 is for example an extensometer. As examples, the measuring instrument 11 may be an optical extensometer, a mechanical extensometer, an LVDT type extensometer (acronym for Linear Variable Differential Transformer), or any other type of extensometer.

In the example illustrated in FIG. 1, only one measuring instrument 11 is illustrated. However, it is understood that several measuring instruments 11 may be installed such that each is arranged to measure the relative displacement of a first point with respect to a second point, each measuring instrument 11 being associated with a paired first point and second point. In other words, in the case where the system 1 comprises several measuring instruments 11, each of these instruments is associated with a pair of points of the material 5 that is specific to it.

As explained above, the crack 3 has been previously detected in the material 5 using a non-destructive process such as eddy current testing or ultrasonic testing. Such methods allow collecting information about the crack, and in particular whether it is a surface crack or an embedded crack.

The determination of which case applies makes it possible to determine the number of measuring instruments such as instrument 11 to be installed as well as the positioning of each one. In the case where the crack 3 is a surface crack, a single measuring instrument 11 is sufficient. In this situation, it is also particularly advantageous to select a first point and a second point located one on each side of the crack 3. In other words, it is advantageous that the first and second points are respectively located on the lips of the crack 3. This is the case in the example illustrated in FIG. 1. However, in the case where the crack 3 is an embedded crack, several measuring instruments 11 are required. Of course, the skilled person understands that it is also possible to use several measuring instruments 11 in the case where the crack 3 is a surface crack, which improves the accuracy of the measurements obtained and therefore the determination of the characteristics of the crack 3.

The measuring instrument 11 is further arranged to transmit the relative displacement measurements to the processing unit 13. It is understood that, for each opening mechanical load applied to the material 5 by the device 9, each measuring instrument 11 transmits to the processing unit 13 the induced relative displacement measured within the pair of first and second points with which it is associated. Similarly, for each closing mechanical load applied to the material 5 by the device 9, each measuring instrument 11 transmits to the processing unit 13 the relative displacement measured within the pair of first and second points with which it is associated.

It is of course possible, following the application of an opening or closing mechanical load to the material 5 by the device 9, that no relative displacement is measured within a pair of first and second points. In such case, the relative displacement is considered to be zero and the measuring instrument 11 associated with the pair of points in question then transmits the information of zero relative displacement to the processing unit 13.

Moreover, as previously explained, the measuring instrument(s) 11 may allow the device 9 to determine whether the mechanical load applied by the latter to the material 5 is an opening or closing mechanical load. Indeed, for a given mechanical load applied by the device 9 to the material 5, each measuring instrument 11 can measure the relative displacement of the first point with respect to the second point so that, if this relative displacement corresponds to a distance from the first and second point, it is an opening mechanical load. On the other hand, if this relative displacement shows that the first and second points get closer to each other, it is a closing mechanical load.

The processing unit 13 is arranged to determine characteristics of the crack 3 present in the material, as a function of the amplitude of each opening and closing mechanical load applied to the material 5 and of the relative displacements measured by the measuring instrument(s) 11. More specifically, the processing unit 13 is arranged to estimate the direction of the crack 3. Advantageously, the processing unit 13 is further arranged to determine the position of the tip or tips of the crack 3. As explained previously and illustrated in FIG. 2A, the crack 3 has one tip P when it is a surface crack. Conversely, and as illustrated in FIG. 2B, the crack 3 has two tips $P_1$ and $P_2$ when it is embedded.

The processing unit 13 is further arranged to receive the information about the amplitude of each opening and closing mechanical load applied to the material 5 by the device 9. The processing unit 13 is further arranged to receiving the relative displacement measurements obtained by the measuring instrument(s) 11 and induced by the opening and closing mechanical loads applied to the material 5 by the device 9.

The processing unit 13 comprises a memory 15 and a processor 17.

The memory 15 is configured to store the instructions of a computer program whose implementation, by the processor 17, results in the operation of the processing unit 13. The operation of the processing unit 13 and the use of the various data and information transmitted by the other entities of the system 1, and in particular by the measuring instrument(s) 11 and by the device 9, will be described in more detail below.

A method for determining characteristics of a crack in a material according to the invention will now be described with reference to FIG. 3.

In a first step S1, the presence of the crack 3 is detected in the material 5 by means of a non-destructive process. For example, as previously explained, the crack 3 is detected in the material 5 by eddy current testing or ultrasonic testing. A non-destructive process makes it possible to determine an area of presence of the crack 3 in the material 5. Such a method also makes it possible to determine whether the crack 3 is a surface crack such as the one illustrated in FIG. 2A or an embedded crack such as the one illustrated in FIG. 2B.

In a second step S2, the diagnostic module 7 determines at least two initial mechanical loads applied to the material 5, each mechanical load being defined by a vector field of known amplitude. In the example illustrated in FIG. 1, the diagnostic module 7 identifies two initial mechanical loads $F_1$, $F_2$. As explained above, an initial load designates, for example, an external pressure applied to the material 5, the weight of the material 5, mechanical bending, tensile stress, or any other mechanical stress undergone by the material 5. As explained above, a mechanical load is a vector field characterized by an amplitude.

The initial mechanical loads may be any mechanical load applied to the material 5. Advantageously, the initial mechanical loads are mechanical loads likely to solicit the crack 3.

During the prior detection of the presence of the crack in the material 5 implemented during step S1, the diagnostic module 7 can also determine initial mechanical loads responsible for the presence of the crack or having an impact on it. The two initial mechanical loads can then be two mechanical loads among the mechanical loads thus detected.

The diagnostic module 7 transmits the information concerning the identified initial mechanical loads to the device 9 for applying mechanical loads.

In a third step S3, one or more measuring instruments 11 are installed at the area of presence of the crack 3. In the case where the non-destructive process has enabled identifying that the crack 3 is a surface crack, a single measuring instrument 11 is sufficient and is advantageously installed at the opening of the crack 3. In the case where the non-destructive process has enabled identifying that the crack 3 is an embedded crack, several measuring instruments 11 are advantageously installed in the area of presence of the crack 3.

As explained above, each measuring instrument 11 is associated with a paired first point and second point. A measuring instrument 11, associated with a pair of first and second points, is arranged to measure the relative displacement of the first point with respect to the second point.

Figure 4:
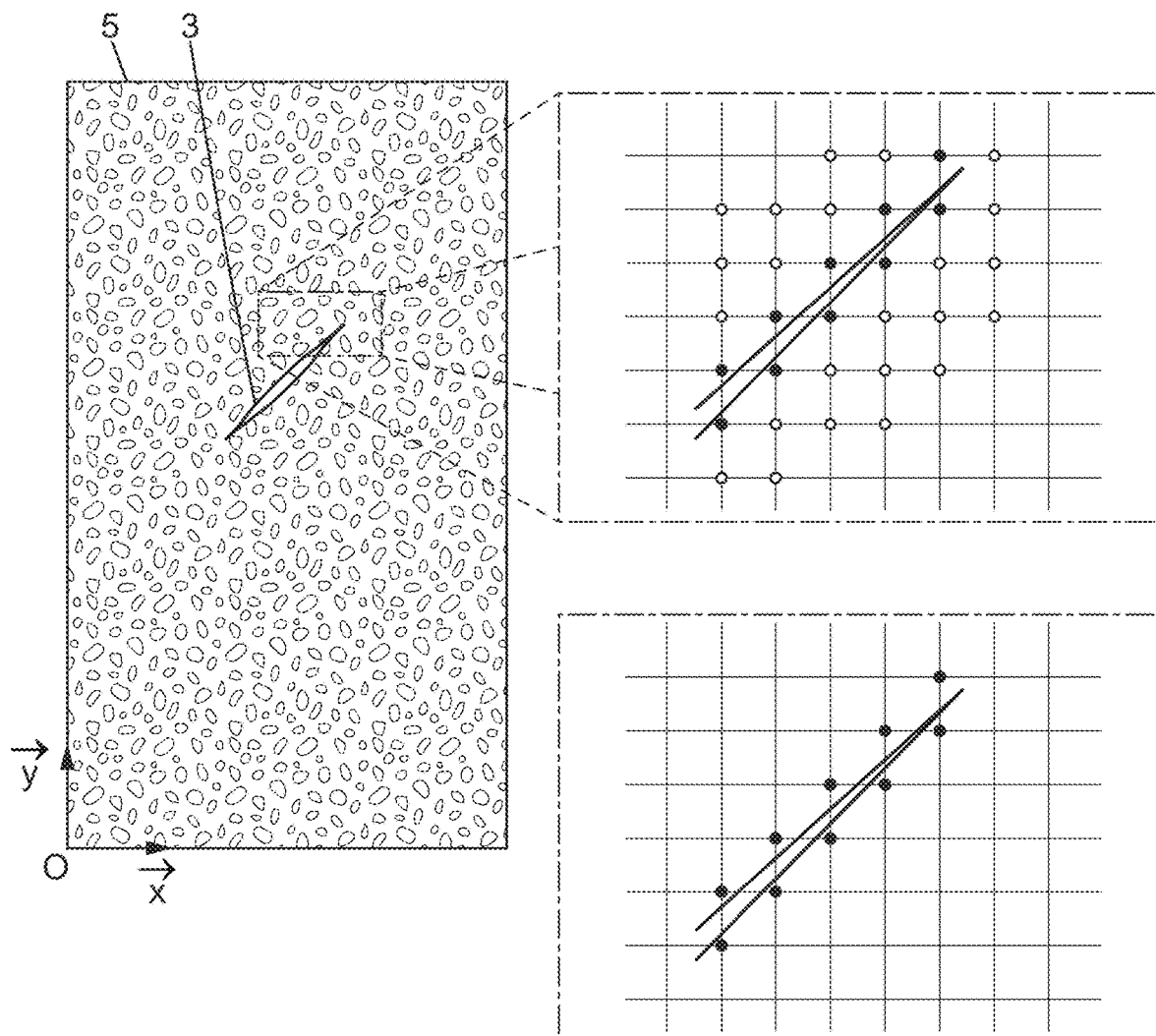
FIG. 4 illustrates a gridding of the area of presence of the crack.

FIG. 4 illustrates a gridding of a portion of the area of presence of the crack 3. As explained above, the projection of the material 5 in a plane (Oxy) is considered, so the relative displacements of the points in only two orthogonal directions are considered. Indeed, as explained above, the object of the present invention is to determine characteristics of the projection of the crack 3 in a plane of interest of the material 5. Thus, the direction of the projection of the crack 3 is in fact determined in the chosen plane of interest, here plane (Oxy). Similarly, the position of the projection of the tip or tips of the crack 3 in the same plane of interest (Oxy) is determined. This gridding of the area of presence makes it possible to define pairs of first and second points. For example, a pair of first and second points is formed by two adjacent points. Each pair of first and second points thus formed is associated with a measuring instrument 11 arranged to measure the relative displacement of the first point with respect to the second point. Of course, when the area of presence of the crack is gridded, the direction of the crack 3 and the position of its tips $P_1$ and $P_2$ are not known, so we are not yet able to determine which are the pairs of first and second points for which the measurements to be made are relevant.

In a fourth step S4, the device 9 applies one or more crack 3 opening mechanical loads to the material 5. Each opening mechanical load is a linear combination of the initial mechanical loads identified by the diagnostic module 7.

Each opening mechanical load applied to the material 5 causes an opening of the crack 3, in other words a separation of the lips of the crack 3.

Advantageously, the opening mechanical loads applied to the material 5 are of small amplitude, so that the material 5 adopts an elastic and linear mechanical behavior. Moreover, the device 9 controls the amplitude of each opening mechanical load. The device 9 transmits the amplitude of each applied opening mechanical load to the processing unit 13.

In a fifth step S5, in response to each opening mechanical load applied to the material 5, each measuring instrument 11 associated with a pair of first and second points measures the relative displacement of the first point with respect to the second point induced by the opening mechanical load considered.

Thus, each measuring instrument 11 performs as many relative displacement measurements as the device 9 applies opening mechanical loads to the material 5. Furthermore, each measuring instrument 11 transmits the measurements made to the processing unit 13. It is therefore understood here that a correspondence can be established, at the processing unit 13, between the amplitude of an opening mechanical load applied to the material 5 and the measurements of the relative displacements induced by the opening mechanical load in question, respectively made by the measuring instruments 11. Of course, when the crack 3 is a surface crack and only one measuring instrument 11 has been installed, the amplitude of each opening mechanical load is associated with a single measurement of relative displacement, meaning the one made by the only measuring instrument 11 installed.

During a sixth step S6, the device 9 applies one or more crack 3 closing mechanical loads to the material 5. Similarly to the opening mechanical load, each closing mechanical load is a linear combination of the initial mechanical loads identified by the diagnostic module 7.

Each closing mechanical load applied to the material 5 causes a closure of the crack 3, meaning it draws the lips of the crack 3 closer together.

Advantageously, the closing mechanical loads applied to the material 5 are of small amplitude, so that the material 5 adopts an elastic and linear mechanical behavior. The device 9 transmits the amplitude of each closing mechanical load to the processing unit 13.

In a seventh step S7, in response to each closing mechanical load applied to the material 5, each measuring instrument 11 associated with a pair of first and second points measures the relative displacement of the first point with respect to the second point induced by the closing mechanical load considered.

Thus, each measuring instrument 11 performs as many relative displacement measurements as the device 9 applies closing mechanical loads to the material 5. Furthermore, each measuring instrument 11 transmits the measurements made to the processing unit 13. It is therefore understood here that a correspondence can be established, at the processing unit 13, between the amplitude of a closing mechanical load applied to the material 5 and the measurements of the relative displacements induced by the closing mechanical load in question, respectively made by the measuring instruments 11. Of course, when the crack 3 is a surface crack and only one measuring instrument 11 has been installed, the amplitude of each closing mechanical load is associated with a single measurement of relative displacement, meaning the one made by the only measuring instrument 11 installed.

Figure 3:
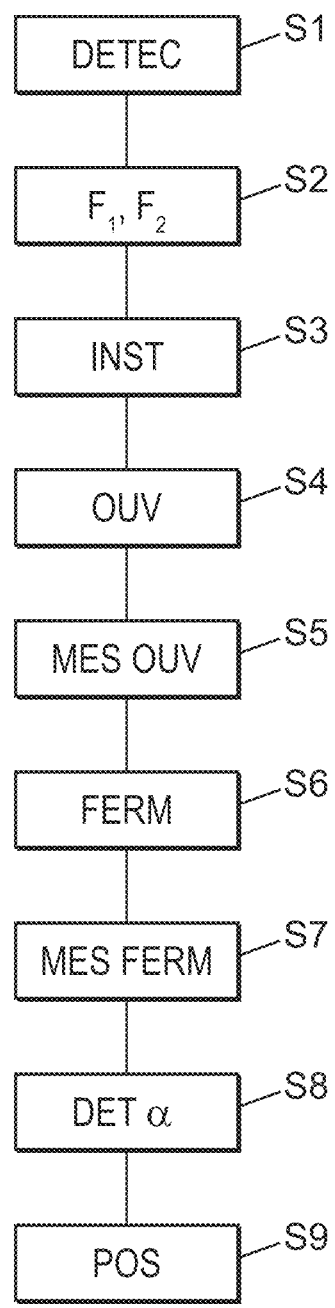
FIG. 3 illustrates a method for determining characteristics of a crack in a material according to the invention.

In the example illustrated in FIG. 3, the device 9 first applies opening mechanical loads and then closing mechanical loads. However, it is understood that the device 9 may alternatively first apply closing mechanical loads and only then opening mechanical loads.

Moreover, as previously explained, when the device 9 applies a mechanical load to the material 5, the measuring instrument(s) 11 may make it possible, in one embodiment, to determine whether the mechanical load applied is an opening mechanical load, which therefore corresponds to step S4, or a closing mechanical load, which corresponds to step S6. Thus, if the measurement made by a measuring instrument 11 reveals an increase of the distance between the first and second associated points, the mechanical load is an opening mechanical load whereas, if the measurement performed by a measuring instrument 11 shows a decrease of the distance between the first and second associated points, the mechanical load is a closing mechanical load.

Of course, if several measuring instruments 11 are used during the application of a given mechanical load to the material 5 by the device 9, it is possible for example to compare the number of measuring instruments 11 detecting an opening of the crack and the number of measuring instruments 11 detecting a crack closure to determine whether the given mechanical load is an opening or closing mechanical load. It is also possible to calculate an average of the variation of the distance between the first and second points on the set of measuring instruments 11 to determine whether the considered mechanical load is an opening mechanical load opening or a closing mechanical load of the crack 3.

During an eighth step S8, the processing unit 13 determines the direction of the crack 3, as a function of the amplitude of each opening and closing mechanical load applied to the material 5 and of the relative displacements measured by the measuring instrument(s) 11.

This step S8 of determining the direction of the crack 3 will now be described in more detail with reference to FIG. 5.

In a step S81, the processing unit 13 determines, for each pair of first and second points, an opening surface SO representing the amplitude of the opening mechanical load applied to the material 5 as a function of the relative displacement of the first point with respect to the second point in the first direction and of the relative displacement of the first point with respect to the second point in the second direction in a coordinate system (O, x, y, z), where x is the displacement in the first direction, y is the displacement in the second direction, and z is the amplitude of the load applied to the material. Such an opening surface SO is for example illustrated in FIG. 6.

Figure 6:
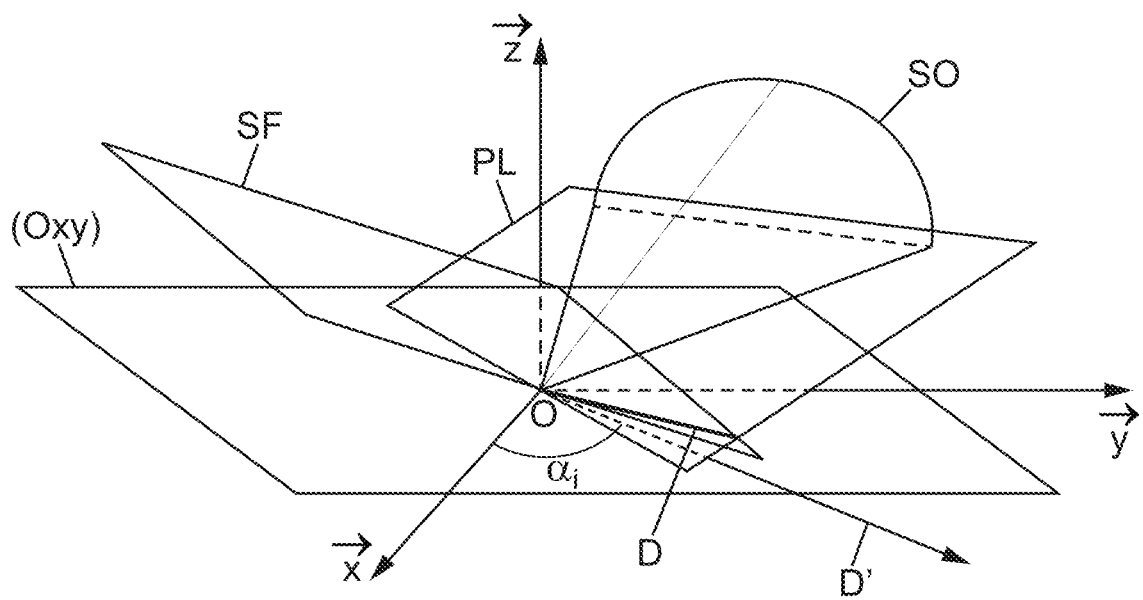
FIG. 6 illustrates an opening surface and a closing surface for estimating the direction of the crack.

As explained above, the opening mechanical loads applied to the material 5 are advantageously of small amplitude so that the material 5 adopts an elastic and linear mechanical behavior. In such an embodiment, and as illustrated in FIG. 6, the inventors have found that the opening surface SO is similar to a cone of revolution truncated along a plane PL orthogonal to the base of the cone and comprising the vertex of the cone. Here, the vertex of the cone corresponds to the origin O of the coordinate system (O, x, y, z). Indeed, the application of an opening mechanical load of zero amplitude to the material 5 is equivalent to the absence of application of an opening mechanical load, such that, logically, no displacement is caused and therefore detected, regardless of which pair of first and second points is considered. The value of the relative displacement along the first direction x is therefore zero, as is the value of the relative displacement along the second direction y.

The expression "similar to a truncated cone" is understood to mean that, for a material which perfectly satisfies the hypotheses from applying the formalism and principles of linear elastic fracture mechanics, the opening surface SO obtained, for pairs of measurement points located one on each side of the crack 3 in close proximity to one another, will be a truncated cone. Even so, in practice, these theoretical hypotheses in which the material 5 adopts an elastic and linear behavior so that the opening surface SO approaches or is similar to a truncated cone are not fully satisfied. In such case, the plane PL of truncation of the cone can be obtained using a least squares approximation.

The inventors have indeed found that, for a given material 5, the mechanical load applied to open the crack 3 using tensile stress normal to the plane of the crack 3, also more commonly called Mode I in the literature concerning fracture mechanics, is generally weaker than the mechanical load necessary to achieve the same opening using shear stress acting parallel to the plane of the crack 3 and orthogonal to the leading edge of the crack 3, also more commonly called Mode II. The cone corresponding to the opening surface SO is therefore flattened in the direction of the crack 3.

In a step S82, the processing unit 13 determines, for each pair of first and second points, a closing surface SF representing the amplitude of the closing mechanical load applied to the material 5 as a function of the relative displacement of the first point with respect to the second point in the first direction and of the relative displacement of the first point with respect to the second point in the second direction in the coordinate system (O, x, y, z). Such a closing surface SF is illustrated in FIG. 6.

As explained above, the closing mechanical loads applied to the material 5 are advantageously of small amplitude so that the material 5 adopts an elastic and linear mechanical behavior. In such an embodiment, and as illustrated in FIG. 6, the inventors have found that the closing surface SF is similar to a plane.

The expression "similar to a plane" is understood to mean that, for a material 5 perfectly satisfying the hypotheses from applying the formalism and principles of linear elastic fracture mechanics, the closing surface SF obtained, for pairs of measurement points located one on each side of the crack 3 in close proximity to one another, will be a plane. However, in practice, these theoretical hypotheses in which the material 5 adopts an elastic and linear behavior so the closing surface SF approximates or is similar to a plane are not fully satisfied. In this case, the plane to which the closing surface SF is similar can be obtained using a least squares approximation.

The inventors have indeed found that, for a given material 5, the application of a crack 3 closing mechanical load depends very little, if at all, on the component of this closing mechanical load corresponding to a tensile stress normal to the plane of the crack 3, therefore a mode I component. In other words, the opening response of the crack 3 will depend almost exclusively on the shear stress component, therefore a mode II component. Thus, no relative displacement will be detected in a direction orthogonal to the direction of the crack 3, resulting in obtaining a plane for the closing surface SF.

Regarding the shape of the opening surface SO, similar to a truncated cone, and the shape of the closing surface SF, similar to a plane, some explanatory elements are provided below.

In the context of the linear elastic fracture mechanics, the displacements induced by the application of a mechanical load of small amplitude to the material 5 are linear with respect to the intensity of the mechanical load, even in the presence of a crack. This linear relationship between displacements and the intensity of mechanical load is illustrated by the following equation:

$$\vec{\Delta U} = \hat{S}\vec{F}$$

where:

$\vec{\Delta U}$ is the displacement of a point of material 5, $\vec{F}$ P is the mechanical load applied to the material 5, and $\hat{S}$ is the flexibility tensor of the material 5.

The flexibility tensor of the material 5 depends mainly on the geometric characteristics of the latter. In particular, in the presence of a crack, the response of the material 5 can be distinguished in the case where the crack is open with a flexibility tensor $\hat{S_o}$ and in the case where the crack is closed with the only possibility of sliding of lip, which corresponds to the shear mode II defined above, with a flexibility tensor $\hat{S_F}$.

Modes I and II, which respectively correspond to the opening of the crack and the shear of the crack, make it possible to define the respective mechanical loads $\vec{F}_I$ and $\vec{F}_{II}$. It is understood that the mechanical load $\vec{F}_I$ is in a direction orthogonal to the direction of the crack while the mechanical load $\vec{F}_{II}$ is in the direction of the crack. In the literature, the mechanical loads $\vec{F}_I$ and $\vec{F}_{II}$ corresponding to the modes I and II are chosen so that:

$$\begin{pmatrix}1\\0\end{pmatrix} = \hat{S_o}\vec{F_I}$$

$$\begin{pmatrix}0\\1\end{pmatrix} = \hat{S_o}\vec{F_{II}}$$

$$\begin{pmatrix}0\\0\end{pmatrix} = \hat{S_F}\vec{F_I}$$

$$\begin{pmatrix}0\\1\end{pmatrix} = \hat{S_F}\vec{F_{II}}$$

The considered reference system is the orthonormal coordinate system centered on the tip of the crack 3 and formed by the vectors $\vec{x}_1$ and $\vec{x}_2$ respectively corresponding to the direction of opening of the crack 3, therefore a direction orthogonal to the direction of the crack 3, and to the direction of the crack 3.

The first two equations characterize the fact that it is possible to solicit an open crack 3 at the same time in mode I and in mode II, while the two last equations characterize the fact that a closed crack 3 can be solicited only in mode II. The displacements $\vec{\Delta U}$ are in the local coordinate system ($\vec{x}_1$; $\vec{x}_2$) of the crack 3.

Moreover, because of the linearity of the response of the material 5, a mixed opening of the crack 3, that is to say with a displacement $\Delta U_I$ in the direction $\vec{x}_1$ and a displacement $\Delta U_{II}$ in the direction $\vec{x}_2$ can be obtained by applying a mechanical load $\vec{F}$ verifying:

$$\vec{F} = \Delta U_I \vec{F_I} + \Delta U_{II} \vec{F_{II}}$$

Note also that the mechanical loads necessary to generate the mechanical load $\vec{F}$ both in mode I and mode II are not necessarily orthogonal if these loads are applied far from the tip of the crack 3.

Thus, if we trace in three dimensions ($\Delta U_I$; $\Delta U_{II}$; $\|\vec{F}\|$) the amplitude, or norm, of the mechanical load applied to the material 5 as a function of the displacements in the local coordinate system ($\vec{x}_1$; $\vec{x}_2$) of the crack 3, we get:

A cone with a point of degeneracy at the point of coordinates ($\Delta U_I=0$; $\Delta U_{II}=0$; $\|\vec{F}\|=0$) for the mechanical loads of opening of the crack 3:

$$\|\vec{F}\| = \sqrt{\Delta U_I^2\|\vec{F_I}\|^2 + \Delta U_{II}^2\|\vec{F_{II}}\|^2 + 2\Delta U_I \Delta U_{II}(\vec{F_I}\cdot\vec{F_{II}})}$$

The preceding equation giving the amplitude of the mechanical load $\vec{F}$ corresponds to the equation of a cone in the case where the mechanical loads $\vec{F}_I$ and $\vec{F}_{II}$ are not colinear. A change of variable in the plane comprising the tip of the crack 3 and defined by the vectors $\vec{x}_1$ and $\vec{x}_2$ such that a rotation ($\Delta U_I \Rightarrow \Delta V_I$; $\Delta U_{II} \Rightarrow \Delta V_{II}$) makes it possible in particular to obtain an equation:

$$\|\vec{F}\| = \sqrt{v_{S_o}^I \Delta V_I^2 + v_{S_o}^{II} \Delta V_{II}^2}$$

where $v_{S_o}^I$ and $v_{S_o}^{II}$ are the eigenvalues of the symmetric part of the open stiffness matrix $(\hat{S}_o^{-1} + {}^t\hat{S}_o^{-1})/2$. The cone is flattened ($v_{S_o}^I \gg v_{S_o}^{II}$) in the direction of the crack (the axis of $\Delta U_{II}$), because $\|\vec{F_I}\| < \|\vec{F_{II}}\|$, which reflects the fact that the load applied to open the crack in mode I is generally lower than that required to obtain the same opening in mode II.

A plane ($\Delta U_{II}$; $\|\vec{F}\|$) for the closing mechanical loads of the crack. Indeed, as explained above, a closing mechanical load does not cause displacement in the direction $\vec{x}_1$ orthogonal to the direction $\vec{x}_2$ of the crack 3 in the plane (Oxy).

Theoretically, for a structure perfectly following the laws of the linear elastic mechanics of the fracture in the presence of a crack, a half-cone cut by a plane orthogonal to the axis of the crack 3 is obtained if the complete spectrum of opening mechanical loads applied to the material 5 is covered.

Figure 5:
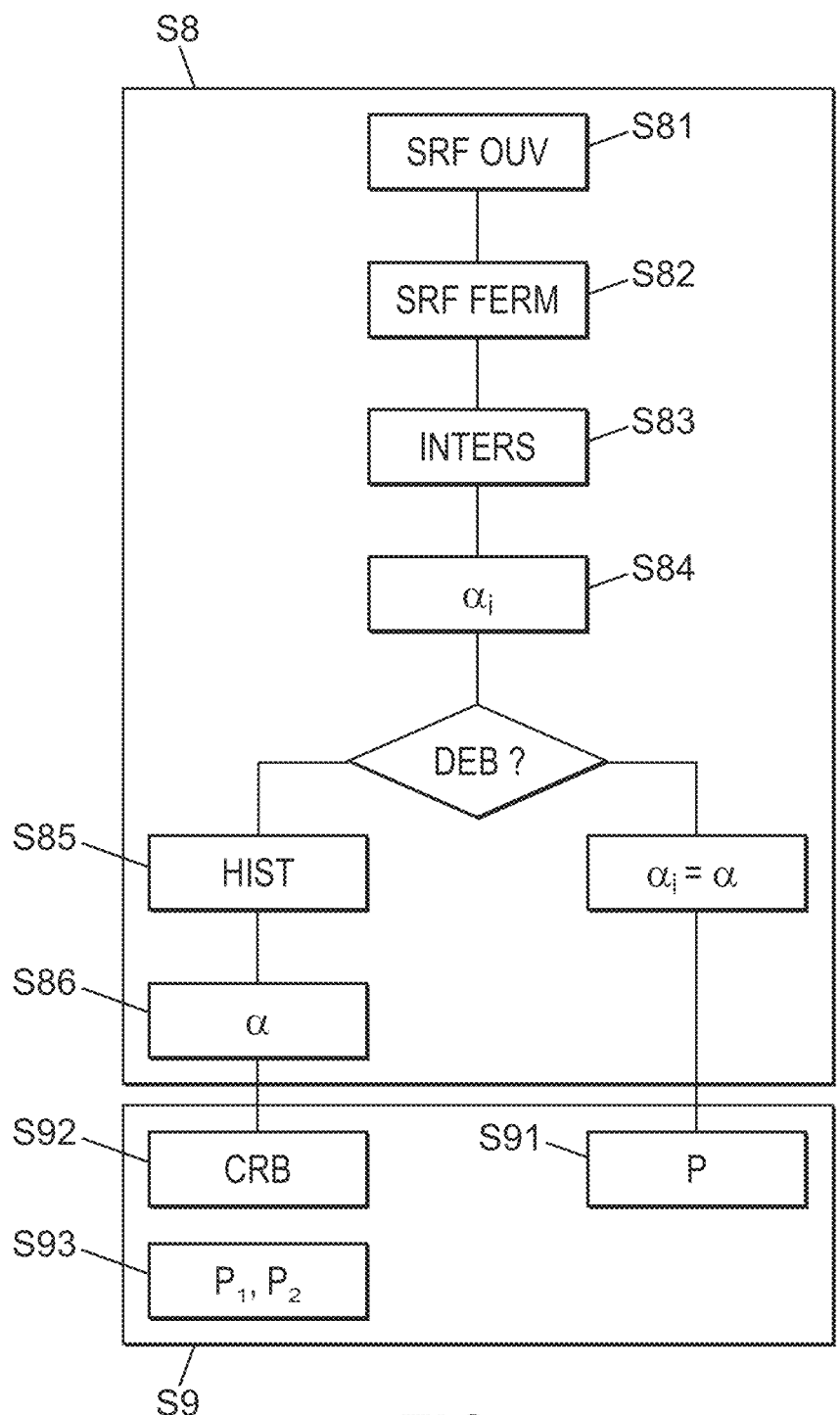
FIG. 5 illustrates in detail a step of determining the direction of the crack and a step of determining the position of the crack tip or tips, of the method illustrated in FIG. 3.

In the example illustrated in FIG. 5, the processing unit 13 determines the opening surface SO then the closing surface SF. However, it is understood that, alternatively, the processing unit 13 may determine the closing surface SF and only then the opening surface SO.

In a step S83, in the embodiment wherein the opening surface SO is similar to a truncated cone and wherein the closing surface SF is similar to a plane, the processing unit 13 determines the straight line D intersecting the truncation plane PL of the cone of revolution corresponding to the opening surface SO and of the plane corresponding to the closing surface SF.

In a step S84, the processing unit 13 then determines the orthogonal projection D' of the line D on plane (Oxy). The processing unit 13 then determines an angle $\alpha_i$ characterizing the direction of the projected line D' obtained. More specifically, and with reference to FIG. 6, the angle $\alpha_i$ corresponds to the angle formed by the projected line D' and by the axis corresponding to the relative displacement along axis x.

Equivalently, the angle formed by the line D' and by the axis corresponding to the relative displacement along y can be determined.

It is of course understood that steps S81, S82, S83, and S84 are implemented for each pair of first and second points such that each angle $\alpha_i$ determined at the end of step S84 is associated with a pair of first and second points and, equivalently, with the corresponding measuring instrument 11.

For the implementation of the rest of the method, the results of the first step S1 concerning the nature of the crack 3 are used. At the end of the first step S1, it has in fact been determined, using a non-destructive process, whether the crack 3 is a surface crack such as the one illustrated in FIG. 2A or an embedded crack such as the one illustrated in FIG. 2B.

We first consider the situation in which the crack 3 is a surface crack. In this case, advantageously, a single measuring instrument 11 is installed near the crack 3. Preferably, the first and second points with which the measuring instrument 11 is associated are located one on each side of the opening of the crack 3, therefore at the entrance to the crack 3. Unlike the case of the embedded crack in which the very vague character of the area of presence forces the use of several measuring instruments 11 and the determination, as explained in the rest of the description, of which pairs of points are relevant, the case of the surface crack allows having much more precise information on the area of presence. Indeed, when the crack 3 is a surface crack, it has an opening at the boundary between the interior and exterior of the material 5 so that the exact position of at least a portion of the crack 3 is known, namely the points located at the opening. This information makes it possible to directly select at least one pair of relevant first and second points, meaning those located at the opening, one on each side of the crack 3.

In such a case, steps S81, S82, S83, and S84 described above have been implemented for a single pair of first and second points. In such an embodiment, the angle $\alpha_i$ illustrated in FIG. 6 and characterizing the direction of the projected line D' obtained therefore corresponds to the direction of the crack 3.

In the case where the crack 3 is a surface crack and where several measuring instruments 11 have been installed instead of only one, the direction of the crack 3 is for example determined by calculating the average of the angles $\alpha_i$ obtained for each pair of first and second points.

We now consider the situation in which the crack 3 is an embedded crack. In this case, advantageously, several measuring instruments 11 are installed in the area of presence of the crack 3.

As explained above, steps S81, S82, S83, and S84 are implemented for each pair of first and second points. In the case illustrated in FIG. 4 in which the crack 3 is embedded and where gridding is used to define pairs of first and second points and to collect data over the entire area of presence of the crack 3, an angle $\alpha_i$ such as the one obtained from step S84 is obtained for each pair of first and second points. Some of the angle values $\alpha_i$ are relevant, namely the pairs of first and second points close to the crack, ideally located one on each side of the crack 3, while other angle values $\alpha_i$ are not relevant, namely the pairs distant from the crack 3 in the area of presence. It is therefore necessary to distinguish the relevant pairs of first and second points from those that are not.

For this purpose, during a step S85, the processing unit 13 generates a histogram of the angle values $\alpha_i$ obtained for each pair of first and second points, the direction of the crack 3 being determined based on the histogram. Such a histogram is for example illustrated in FIG. 7.

Figure 7:
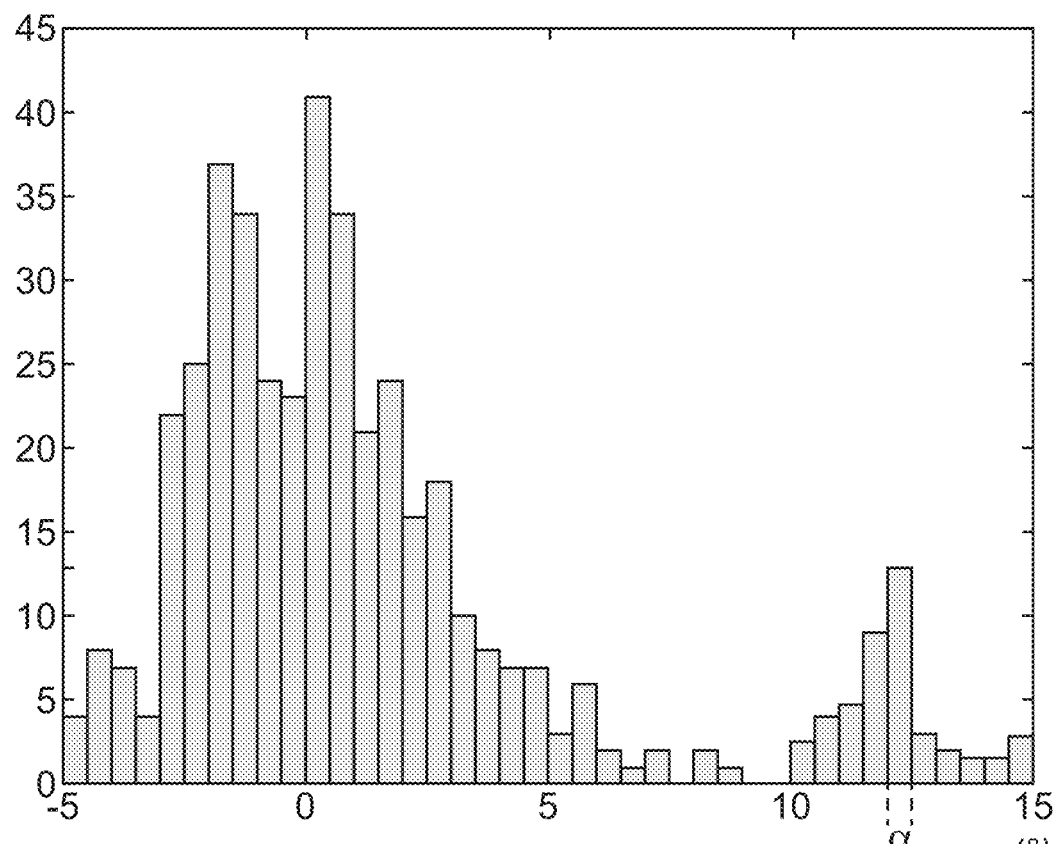
FIG. 7 illustrates a histogram of angle values obtained for several pairs of points of the cracked material.

As illustrated in FIG. 7, the processing unit 13 determines, for each angle value or for each range of angle values, the number of pairs of first and second points for which the angle $\alpha_i$ determined during step S84 corresponds to the angle value or is comprised within the interval of angle values. In the example illustrated in FIG. 7, all the determined angle values $\alpha_i$ are between −5° and 15°. The interval [−5°, 15°] is subdivided into intervals of 0.5°. For example, it can be seen from FIG. 7 that, for more than 40 pairs of first and second points, an angle value $\alpha_i$ comprised between 0.5° and 1° has been determined. On the other hand, an angle value $\alpha_i$ comprised between 9.5° and 10° has not been determined for any pair of first and second points.

In a step S86, the processing unit 13 determines the direction of the crack 3 based on the generated histogram. For example, the direction of the crack corresponds to the angle of a local maximum of the histogram.

A local maximum is defined as an angle value, or an interval of angle values in the case of FIG. 7, obtained by strictly more pairs of first and second points than the immediately adjacent angle values, or intervals of angle values. In the histogram illustrated in FIG. 7, one can distinguish several local maxima. For example, the interval of angle values $\alpha_i$ [0.5°; 1°] is a local maximum since more than forty pairs of first and second points have resulted, in step S84, in determining an angle $\alpha_i$ in this interval, compared to less than 35 for the interval [1°; 1.5°] and less than 25 for the interval [0°, 0.5°]. As other examples, the interval [−4.5°, −4°] also corresponds to a local maximum, as well as the interval [5.5°, 6°].

It is not surprising to obtain one or more local maxima in proximity to angle $\alpha_i=0°$. Indeed, as explained above, the pairs of first and second points were selected in the area of presence of the crack 3, for example with gridding, without knowing the direction or position of the tips of the crack 3. Thus, a significant number of irrelevant pairs of first and second points may potentially be selected. In FIG. 4, the irrelevant points have been represented by open circles while the relevant points have been represented by disks, meaning solid circles. As illustrated, the first and second points of the irrelevant pairs are certainly in the area of presence of the crack 3 but are at a distance from the latter so that the application of an opening or closing mechanical load by the device 9 causes only a small relative displacement, or no displacement, of the first point relative to the second point, thereby obtaining an angle $\alpha_i$ close to 0°. Given the statistical over-representation of irrelevant pairs of first and second points, many values $\alpha_i$ close to 0° are therefore found in the histogram.

However, the use of several measuring instruments 11 to cover the area of presence of the crack 3 also makes it possible to select relevant pairs of first and second points. For example, a pair of first and second points is relevant if the first and second points are located one on each side of the crack 3. Unlike the irrelevant pairs of first and second points, the application of an opening or closing mechanical load causes a characteristic and substantial relative displacement of the first point with respect to the second point. Thus, for a relevant pair of points, an angle $\alpha_i$ far from 0° is likely to be obtained at the end of step S84.

In one embodiment, the direction of the crack 3 is determined by selecting the local maximum furthest from 0°. Referring again to FIG. 7 illustrating the generated histogram, the local maximum furthest from 0° is the interval [12°, 12.5°]. The direction of the crack 3 is therefore characterized by an angle value $\alpha$ comprised between 12° and 12.5°.

Of course, those skilled in the art understand that the direction of the crack 3 can be characterized by an angle value close to 0°. In such case, the principle according to which the direction of the crack 3 corresponds to the angle value furthest, therefore the one least near, from 0° also applies.

At the end of the eighth step S8, we thus have the direction of the crack 3, or more precisely the direction of the projection of the crack 3 in plane (Oxy), which is characterized by an angle $\alpha$ in a plane of projection of the material 5. In other words, knowing the direction of the crack 3 and the relevant pair(s) of first and second points at the end of step S8, it is possible to determine, in the material 5, a line on which the tip or tips of the crack 3 are known to be located, or more precisely a line on which the projections of the tip or tips of the crack 3 in plane (Oxy) are located.

During a ninth step S9, the processing unit 13 determines the position of the tip or tips of the crack 3.

Referring again to FIG. 5, the determination of the position of the tip or tips of the crack 3 is dependent on the nature of the crack 3.

Let us first consider the case in which the crack 3 is a surface crack. In such case, the crack 3 comprises a single tip P.

During a step S91, the length of the crack 3 corresponding to the distance between the opening and the tip P of the crack 3 can be determined using a non-destructive process. The processing unit 13 then determines the position of the tip P of the crack 3 as a function of the direction and length of the crack 3.

We now consider the case in which the crack 3 is an embedded crack. In such case, the crack 3 comprises two tips $P_1$ and $P_2$.

During a step S92, the processing unit 13 plots a curve representing, along the direction of the crack 3, the angle $\alpha_i$ obtained for each pair of first and second points located in the direction of the crack 3. In other words, during this step S92, only the relevant pairs of first and second points are considered, in other words those comprising a first point and a second point located one on each side of the crack 3, but also those located in the direction of the crack 3 beyond the tips of the crack 3. In addition, determining the direction of the crack 3 makes it possible to determine a line on which the tips of the crack 3 are located. One may note that the histogram obtained during step S85 makes it possible to directly determine the pairs of points located along the crack 3. For example, the pairs of points located along the crack 3 correspond to the pairs of points for which the obtained angle $\alpha_i$ is close to the angle $\alpha_i$ determined and characterizing the direction of the crack 3. In the meaning of the histogram such as the one illustrated in FIG. 7, the relevant pairs of points designate, for example, the pairs of measurement points for which the obtained angle $\alpha_i$ is within the neighborhood of the angle $\alpha$. For example, the range of angle values $\alpha_i$ for which the pairs of measurement points are considered relevant corresponds to the range of values from the largest local minimum less than $\alpha$ to the smallest local minimum greater than $\alpha$. For example, still with reference to the example illustrated in FIG. 7, the relevant pairs of measurement points are those for which an angle $\alpha_i$ is obtained comprised between 9.5° and 14°.

Knowledge of the direction of the crack 3 thus makes it possible to reduce a two-dimensional problem, since the points considered are located in the plane, to a one-dimensional problem, since only the points located in the direction of the crack 3 are considered. Such a curve is illustrated in FIG. 8.

During a step S93, the processing unit 13 determines, as a function of the angle $\alpha$ corresponding to the direction of the crack 3, a plateau in the plotted curve, such that the two pairs of first and second points marking the two ends of the plateau respectively correspond to the tips of the crack 3.

Figure 8:
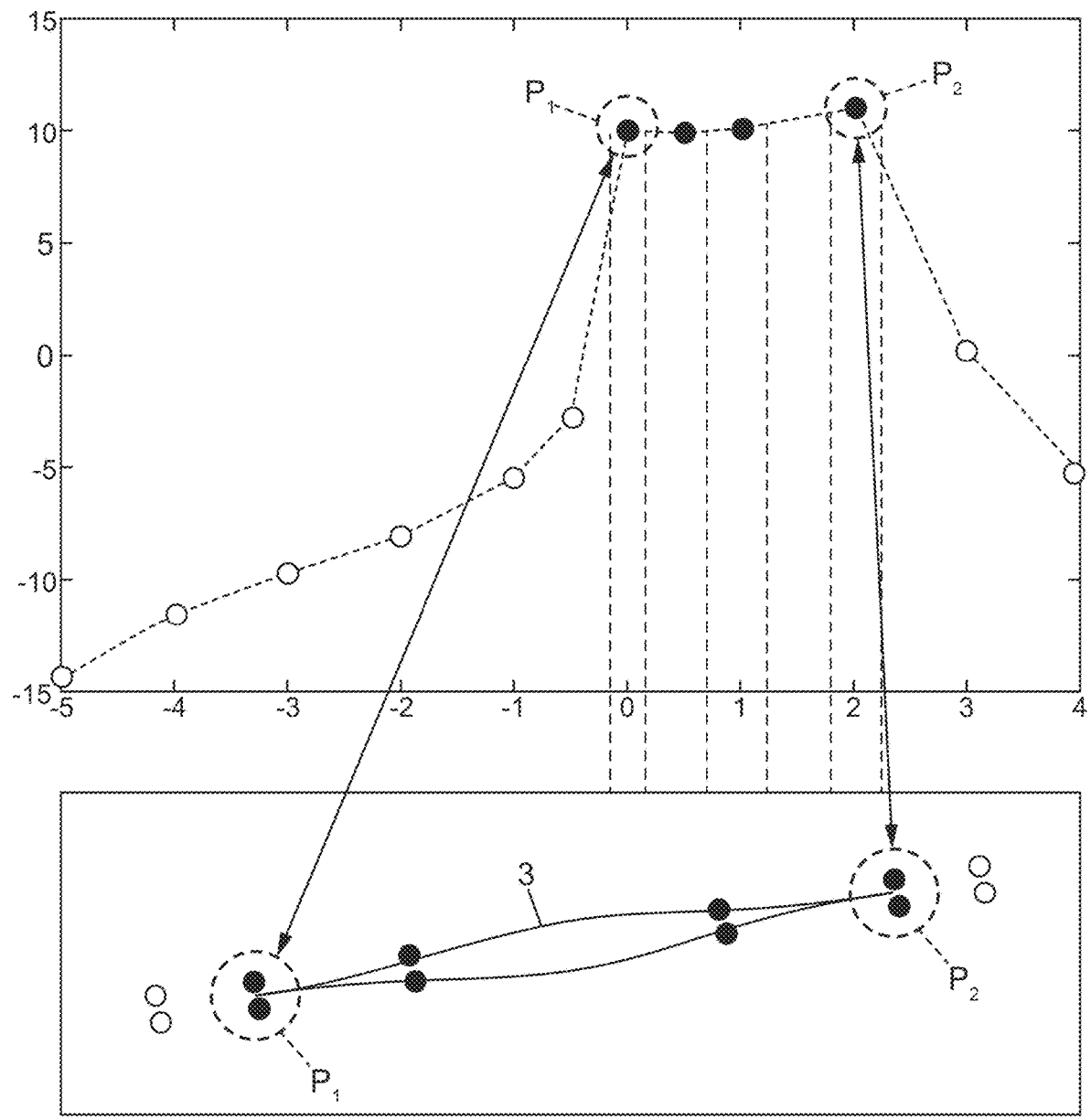
FIG. 8 illustrates a curve representing, along the direction of the crack, the angle obtained for each pair of points located one on each side of the crack.

On the curve illustrated in FIG. 8, the set of pairs of first and second points in the direction of the crack 3 and the angle value $\alpha_i$ associated with each pair are represented. One can then distinguish the pairs of first and second points located along the crack 3, meaning between the tips of the crack 3, and the pairs of first and second points located beyond the tips of the crack 3. The angle values $\alpha_i$ of the pairs of first and second points along the crack 3 define a plateau. It is then understood that the ends of this plateau correspond to the tips of the crack 3. The processing unit 13 is then able to determine the position of tips $P_1$ and $P_2$ of the crack 3.

At the end of step S91 or step S93, we therefore have the direction of the crack 3 as well as the position of the tip or tips of the crack 3. Such information then makes it possible for example, using the model of the linear elastic fracture mechanics, to predict the propagation of the crack 3 in order to evaluate its harmfulness. When the crack 3 is significantly harmful and is for example likely to dangerously degrade an industrial structure, it is then for example possible to apply mechanical loads to the material 5 to hinder propagation of the crack 3. For example, the device 9 for applying mechanical loads can be used to hinder propagation of the crack 3 in the material.

In the above description of the invention, it concerned the determination of the direction of the crack 3 and the position of the tip or tips of the crack 3. It is of course understood here that this "determination" is in fact an "estimate" within the limits of the capacities and precision of the various devices and instruments used to implement the method. Thus, the described method and system make it possible to estimate the direction of the crack 3 as well as the position of the tip or tips of the crack 3, with a certain precision and therefore with a certain margin of error.

The present invention has several advantages.

First, the proposed method is a non-destructive method for determining characteristics of the crack. This method is applicable in any industrial structure and provides sufficient accuracy for subsequently predicting the propagation of the crack in the material.

Moreover, the context of linear elastic fracture mechanics and the application of opening and closing mechanical loads of small amplitude make it possible to implement the method without excessively stressing the crack or causing it to spread.

Finally, the system of the invention has the advantage that it can be applied to industrial structures in operation, in the manner of an embedded system.

The invention claimed is:

1. A method for determining characteristics of a crack in a material, the presence of the crack being detected beforehand in an area of presence of the material by using a non-destructive process, the method comprising:
   determining at least two initial mechanical loads applied to the material, each mechanical load being defined by a vector field of known amplitude,
   applying a plurality of crack-opening mechanical loads to the material, each opening mechanical load being a linear combination of the at least two initial mechanical loads,
   measuring, using at least one measuring instrument, a relative displacement of a first point with respect to a second point induced by each opening mechanical load, the first and second points being located in the area of presence of the crack, each measuring instrument being associated with a pair of first and second points, applying a plurality of crack-closing mechanical loads to the material, each closing mechanical load being a linear combination of the at least two initial mechanical loads, measuring, using each measuring instrument, the relative displacement of the first point with respect to the second point induced by each closing mechanical load, and estimating a direction of the crack in a predefined plane, by computer means, as a function of the amplitude of each opening and closing mechanical load applied to the material and of the relative displacements measured by the measuring instrument(s).

2. The method of claim 1, wherein at least one measuring instrument is an extensometer.

3. The method of claim 1, wherein the opening and closing mechanical loads applied to the material are of small amplitude, thus mechanical loads ensuring the material to keep an elastic and linear mechanism behavior.

4. The method of claim 3, wherein weighting coefficients for the linear combination of the at least two initial mechanical loads are real numbers between −1 and 1.

5. The method of claim 3, wherein the measurement of the relative displacement of a first point with respect to a second point comprises measuring the relative displacement of the first point with respect to the second point in a first direction and measuring the relative displacement of the first point relative to the second point in a second direction, said second direction being orthogonal to the first direction.

6. The method of claim 5, further comprising a determination, for each pair of first and second points, of an opening surface representing the amplitude of the opening mechanical load applied to the material as a function of the relative displacement of the first point with respect to the second point in the first direction and of the relative displacement of the first point with respect to the second point in the second direction in a coordinate system, where x is the displacement in the first direction, y is the displacement in the second direction, and z is the amplitude of the opening mechanical load applied to the material.

7. The method of claim 6, wherein the opening surface is similar to a cone of revolution truncated along a plane orthogonal to a base of the cone and comprising a vertex of the cone.

8. The method of claim 7, further comprising a determination, for each pair of first and second points, of a closing surface representing the amplitude of the closing mechanical load applied to the material as a function of the relative displacement of the first point with respect to the second point in the first direction and of the relative displacement of the first point with respect to the second point in the second direction in a coordinate system, where x is the displacement in the first direction, y is the displacement in the second direction, and z is the amplitude of the load applied to the material, wherein the determination of the direction of the crack comprises:

determining a line of intersection of the truncation plane of the cone of revolution corresponding to the opening surface and the plane corresponding to the closing surface, determining an orthogonal projection of the line of intersection on plane and an angle characterizing the direction of a projected line obtained, said angle corresponding to the angle formed by the projected line obtained and by the axis corresponding to the relative displacement along the axis x or the axis corresponding to the relative displacement along axis y.

9. The method of claim 8, wherein the crack is a surface crack having an opening at a boundary between an interior and an exterior of the material and wherein a single measuring instrument is installed to measure the relative displacement of a first point with respect to a second point, the first and second points being located one on each side of the crack at a level of the opening, the angle characterizing the direction of the projected line corresponding to the direction of the crack.

10. The method of claim 9, wherein a length of the crack corresponding to the distance between the opening and a tip of the crack is determined using a non-destructive process, the method further comprising the determination of the tip of the crack as a function of the direction and length of the crack.

11. The method of claim 10, further comprising a prediction of the propagation of the crack, using the direction, the position of the tip or tips of the crack, and a model of linear elastic fracture mechanics, in order to evaluate its harmfulness.

12. The method of claim 8, wherein the crack is an embedded crack and wherein a plurality of measuring instruments is installed, the method further comprising a generation of a histogram of angle values obtained for each pair of first and second points, the direction of the crack being determined on the basis of the histogram.

13. The method of claim 12, wherein the direction of the crack corresponds to the angle of a local maximum of the histogram, the local maximum being the furthest from 0°.

14. The method of claim 12, further comprising the determination of the respective positions of the tips of the crack, the determination comprising:

plotting a curve representing, along the direction of the crack, the angle obtained for each pair of first and second points located one on each side of the crack, determining, based on the angle corresponding to the direction of the crack, a plateau in the plotted curve, such that the two pairs of first and second points marking two ends of the plateau respectively correspond to the tips of the crack.

15. The method of claim 14, further comprising a prediction of the propagation of the crack, using the direction, the position of the tip or tips of the crack, and a model of linear elastic fracture mechanics, in order to evaluate its harmfulness.

16. The method of claim 5, further comprising a determination, for each pair of first and second points, of a closing surface representing the amplitude of the closing mechanical load applied to the material as a function of the relative displacement of the first point with respect to the second point in the first direction and of the relative displacement of the first point with respect to the second point in the second direction in a coordinate system, where x is the displacement in the first direction, y is the displacement in the second direction, and z is the amplitude of the closing mechanical load applied to the material.

17. The method of claim 16, wherein the closing surface is similar to a plane.

18. A non-transitory computer-readable medium storing a code of a computer program comprising instructions for implementing the method of claim 1, when the instructions are executed by at least one processor.

19. A system for determining characteristics of a crack in a material, a presence of the crack having been detected beforehand in an area of presence of the material by means of a non-destructive process, the system comprising:
- a diagnostic module for the material, arranged to determine at least two initial mechanical loads applied to the material, each mechanical load being defined by a vector field of known amplitude,
- a device for applying mechanical loads, arranged for:
- applying a plurality of crack-opening mechanical loads to the material, each opening mechanical load being a linear combination of the at least two initial mechanical loads,
- applying a plurality of crack-closing mechanical loads to the material, each closing mechanical load being a linear combination of the at least two initial mechanical loads,
- at least one measuring instrument arranged to measure a relative displacement of a first point with respect to a second point induced by each opening load and by each closing load, the first and second points being located in the area of presence of the crack, each measuring instrument being associated with a pair of first and second points, and
- a processing unit arranged to estimate a direction of the crack in a predefined plane as a function of the amplitude of each opening and closing mechanical load applied to the material and of the relative displacements measured by the measuring instrument(s).

* * * * *